INVENTORS
WILLIAM W. HUBER
RICHARD L. DANA

BY Bartholomew Diggins
ATTORNEY

Aug. 11, 1970 W. W. HUBER ET AL 3,523,344
APPARATUS FOR DRY PRESSING CERAMIC TILE
Filed May 8, 1967 4 Sheets-Sheet 3

INVENTORS
WILLIAM W. HUBER
RICHARD L. DANA
BY Bartholomew Diggins
ATTORNEY

Aug. 11, 1970 W. W. HUBER ET AL 3,523,344
APPARATUS FOR DRY PRESSING CERAMIC TILE
Filed May 8, 1967 4 Sheets-Sheet 4
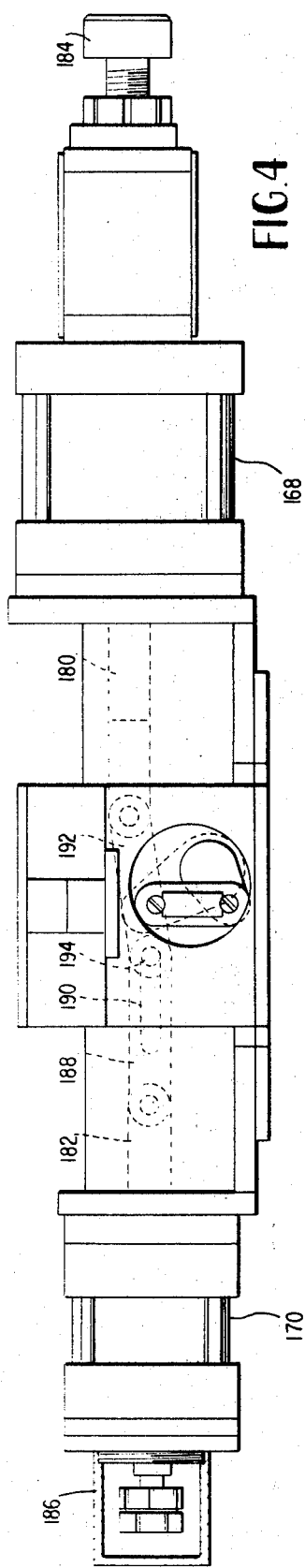
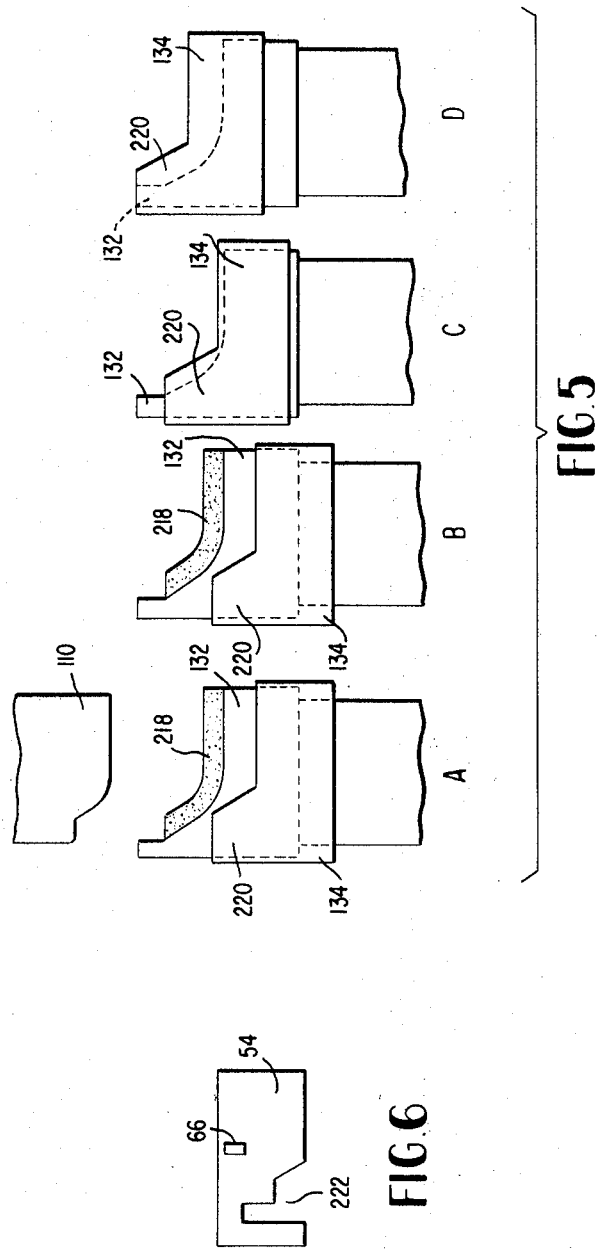
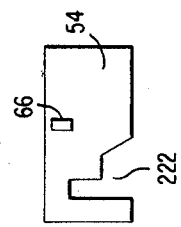
INVENTORS
WILLIAM W. HUBER
RICHARD L. DANA
BY Bartholomew Diggins
ATTORNEY 3,523,344
APPARATUS FOR DRY PRESSING CERAMIC TILE
William W. Huber, North Canton, and Richard L. Dana, Canton, Ohio, assignors to United States Ceramic Tile Company, Canton, Ohio, a corporation of Delaware
Continuation-in-part of application Ser. No. 409,303, Nov. 5, 1964. This application May 8, 1967, Ser. No. 636,983
Int. Cl. B28b 3/02
U.S. Cl. 25—89                                  13 Claims

ABSTRACT OF THE DISCLOSURE

A method and apparatus is illustrated for dry pressing granular ceramic material in situ by subjecting the material to a first peak pressure, then relieving the pressure on the pressed material while confining the material to retain its general pressed form and subsequently applying pressure to the material which is no greater than the original pressure applied but no less than 75% thereof. The pressing apparatus employs an eccentric driven upper ram connected by means of springs to a male die; the eccentric operating to cause two pressings of the granular material during each rotation thereof while the springs between the male die and the upper ram operate to maintain the pressed material in its pressed form during the interval when pressure is relieved between pressings.

---

This application constitutes a continuation-in-part application of U.S. Ser. No. 409,303 entitled Dry Pressing of Ceramic Tile filed Nov. 5, 1964, and now abandoned.

The present invention relates to a high speed process and apparatus for forming granular ceramic material into dry pressed blanks without lamination stratification, or striation, and more particularly this invention pertains to the utilization of this process in an apparatus for the production of ceramic tiles.

Dry pressing may be defined as pressing a finely divided mass of granular material, slightly moistened, into a compressed shape. A major difficulty encountered in the dry pressing of granular ceramic material into ceramic tile is the occurrence of horizontal laminate within the pressed tile and stratifications which tend to occur along a plane parallel to the pressure surface of the pressure platen. In the case of ceramic tile, these laminae often rupture spontaneously when pressures are removed from a tile blank after the pressing operation, or rupture may occur during or after the firing of the tile.

Heretofore it has been believed that laminate were caused in dry pressed ceramic tile by the entrapment of air during pressing, and operating upon this theory, many efforts have been made to avoid this difficulty. For example, prior pressing apparatus have employed numerous operational steps during which ceramic or other granular materials were subjected to successive pressings within a mold and were removed from the mold for the purpose of exhausting air therefrom between successive pressing cycles.

Prior methods and apparatus for producing dry pressed products which include the provision of an air exhaust step have necessarily been limited to a slow, interrupted pressing cycle. For example, one known apparatus for producing dry pressed ceramic tile blanks without lamination has a maximum output of only ten cycles per minute. Since ceramic tile has a relatively low value per unit, any slowing of the production cycle increases production costs to the point where the ceramic tile becomes uneconomical and non-competitive.

It is a primary object of the present invention to provide a novel method and apparatus for dry pressing granular ceramic material at high speeds without lamination stratification or striation.

Another object of the present invention is to provide a novel high speed pressing apparatus for dry pressing of ceramic tile.

A further object of this invention is to provide a novel high speed pressing apparatus for dry pressing finely divided granular material by subjecting the material to two separate pressing operations during a single uninterrupted cycle of machine operation.

Another object of this invention is to provide a novel high speed pressing apparatus for dry pressing finel divided granular material which subjects said material to two controlled pressing phases during a single cycle of machine operation and maintains such material in its general pressed form during a pressure release phase between said two pressings.

A further object of this invention is to provide a novel high speed pressing apparatus for dry pressing finely divided ceramic material in situ to form a non-laminated ceramic tile.

A still further object of this invention is to provide a novel method for producing dry pressed ceramic tile free from lamination from finely divided ceramic material by subjecting said material in situ to first and second compression pressures with a controlled pressure release between said pressures.

Those and other objects and details of the invention will be readily apparent upon a consideration of the following specification taken with the accompanying drawings in which:

FIG. 4 is a partially sectioned view in side elevation of the mold box operating assembly for the automated press of the present invention.

FIG. 5 is a diagrammatic representation of the mold box operation for the automated press of the present invention; and FIG. 6 is a view in end elevation of the filler box for the automated press of the present invention.

Figure 1:
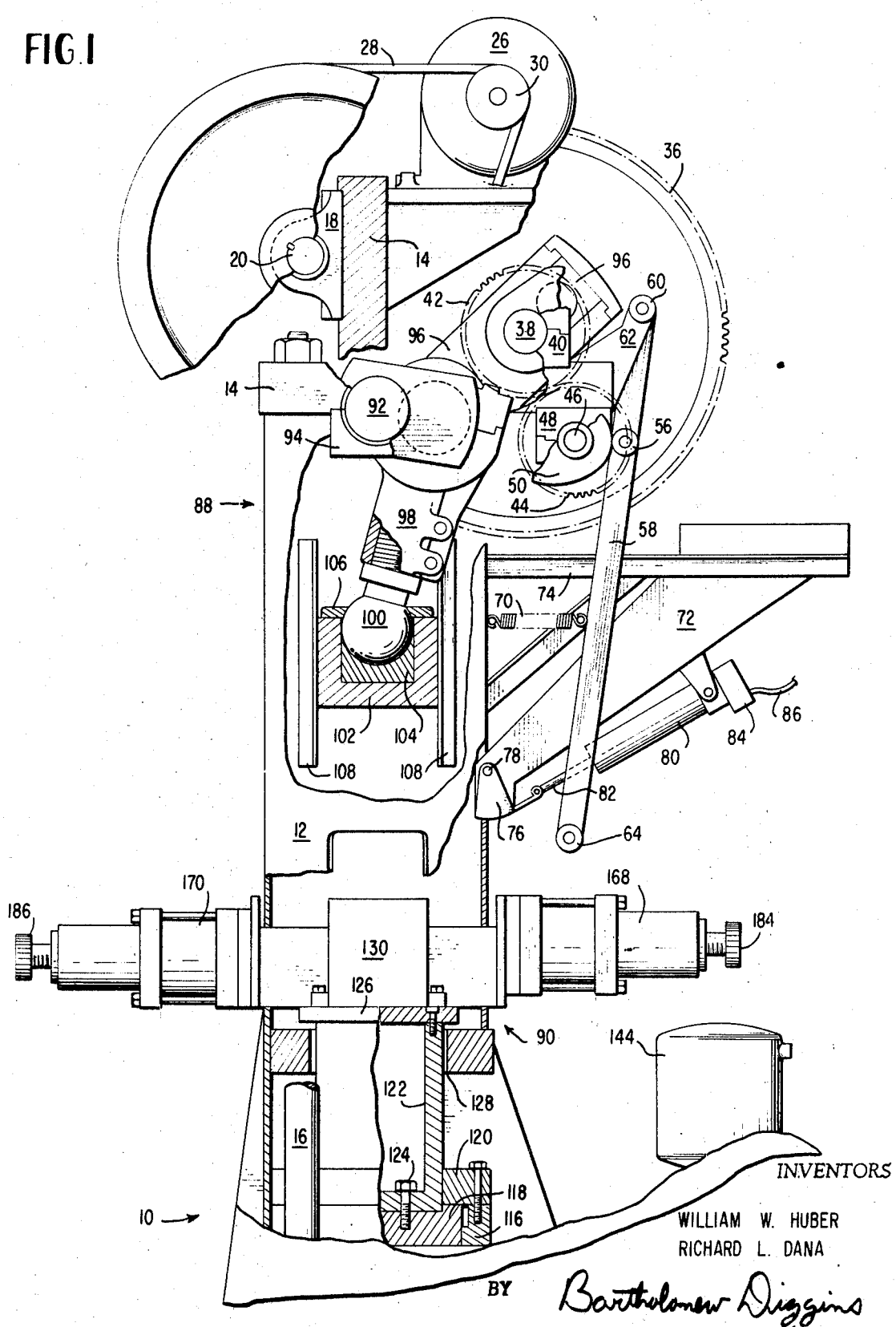
FIG. 1 is a sectional view in side elevation of the automated press of the present invention.

To effectively develop a high speed machine for dry pressing finely divided granular material, it is important that the machine operate upon the material in situ during an uninterrupted pressing cycle to afford high speed conversion of the material. The movement of the material in and out of a mold cavity during a forming operation interrupts and prolongs the operation and prevents the effective achievement of a high speed forming cycle.

To implement the objects of this invention, it is necessary to re-examine the theory that laminae in ceramic tile formed by a dry pressing technique are primarily the result of air trapped during the pressing process. The necessity to remove a blank from a mold cavity during a pressing process to exhaust trapped air must be elimnated if a high speed pressing process is to be achieved.

Our studies in rheology indicate that laminae occurring within blanks formed by a dry pressing process may not be due as much to entrapped air as to the difference between the pressure exerted by the walls of the forming die perpendicular to the face of the pressing platen and that exerted by the platen. For example, in the dry pressing of finely divided ceramic material, pressure is applied to the material within a die cavity by the action of male dies or platens being forced vertically toward each other within a die cavity so that the particles of material are compressed. Since the mass of granular ceramic material from which a dry pressed tile blank is formed is a conglomerate of relatively hard solids, pressures do not equalize throughout the mass as they do in the case of fluids. Instead, as the die platens move vertically and approach each other forcing the finely divided material into a more confined space, pressure forces are created in the die cavity by the lateral movement of the material in the cavity against the unyielding sidewalls thereof. This lateral force within the cavity is the result of the particles in the mass of material being forced between other particles and tending to separate these particles in a horizontal direction.

The compression of the finely divided particles is the result of the particles being forced by the vertically moving platens to fill the spaces within the mass previously occupied by air. Since there is a reasonable clearance between the sidewalls of the die cavity and the approaching male die or platen, air is easily dispelled from the cavity. When substantially all voids within the mass are filled, the particles continue to rearrange themselves in response to increasing vertical pressure in an attempt to fill further voids, the fines being driven into the smaller voids. The more the compression confinement, the greater the lateral movement and the greater the resultant lateral pressure against the sidewalls of the die cavity, and when all possible void are filled by the rearranging action, the continuation of pressure will result in points within the blank where larger particles attempt to wedge between one another. Some of these particles will be wedged sufficiently to be locked in, while others will lie as blunt wedges as long as pressure is applied.

Throughout the rearrangement and wedging action within the mass of granular material, all the particles are restrained from moving outwardly and away from one another by the sidewalls of the die cavity. This results in the application of tremendous force upon these sidewalls with a resultant production of stress within the compressed part. If the pressure upon the compressed granular mass is maintained for a period of time, the stresses within the mass will tend to lessen as the yield strength of the particles is exceeded, and further distortion of particles takes place when the shearing off of some of the particles within the mass and further rearrangement thereof. This tends to lessen the lateral force applied to the sidewalls of the die cavity.

The combined vertical and lateral forces within the die cavity may be maintained substantially in balance as long as the vertical pressure on the compressed material in the cavity is opposing the lateral stresses resulting from the pressure imposed upon the sidewalls of the cavity. However, to effectively accomplish a high speed dry pressing operation, it is not feasible to maintain this pressure balance until the yield strength of the particles within the compressed mass is exceeded. On the other hand, if the force of the male die is relieved before this point, the static sidewall pressure will act upon the mass to cause a series of horizontal laminae. With a quick release of the vertical pressure on the mass, the accompanying relief of lateral pressure imposes a sudden high compression stress on the sides of the mass which results in vertical expansion and rupture thereof. This rupture disunites the compressed material of the mass, progressing first in the form of horizontal laminated stratifications and, if allowed to progress uncontrolled, finally to complete disintegration and breaking up of the material into granular or flake like form within the die. Often, the shock accompanying a rapid release of vertical pressure from the mass tends to set into motion all particles under stress, including the locked in stresses, and the previously compressed mass will virtually explode.

Regardless of whether lamination stratification in dry pressed ceramic tile is the result of air entrappment, internal pressure inequalities, or even some other factor, it has been found that by discarding the air entrappment theory and the process steps previously considered necessary to eliminate air entrappment, a high speed pressing process may be devised. This process may be effectively implemented by concentrating on eliminating the results of later pressure strains within the compressed mass to produce a tile free from lamination stratification by a high speed pressing process.

Basically, the method of the present invention consists of producing a non-laminated ceramic tile by a process of conversion wherein a first pressure is applied to the ceramic material in a tile die to convert such material from a soft, low density, highly mobile dust or finely granulated form to a hard, high density, solid form of low mobility. This first step is followed by a controlled release of the first pressure to permit limited adjustment of the converted mass within the die cavity, and this release step is followed by a second controlled pressure, which is equivalent to or less than the first, to compact the converted mass in the die cavity into a cohesive, solid, non-laminated tile. This entire process is capable of being performed on the mass in situ at high speed during a single, uninterrupted pressing cycle of a tile press.

During the study involved in the formulation of the novel process of this invention, it was found, as previously explained, that if a male die is rapidly removed from the compressed mass after applying a first pressure thereto for a period insufficient to exceed the yield strength of the particles within the mass, the shock of the rapid release tends to set into motion all of the particles under stress. However, it was found that if the male die is caused to move slowly away from the mass in releasing the first pressure, the mass will retain its general shape within the die cavity with the exception that its thickness will be increased to the extent of the stresses relieved. As the stresses are relieved, a series of laminae will result and substantially all of the stresses will be relieved with the exception of the locked in stresses. Therefore, the slow removal of the male die is not effective, for it is desirable to remove substantially all stresses from the compressed mass as well as to increase the speed of the pressing operation.

If the male die is caused to move rapidly away from the compressed mass, the mass might virtually explode, but on the other hand, the more rapid the release of the male die, the more complete is the removal of stress from the compressed mass through the motion of all particles under stress including those subjected to the locked in stresses. Therefore, to achieve effective relief of stress in the compressed part, it is necessary to rapidly remove a male die for a distance which will permit expansion of the compressed part to a point necessary to relieve substantially all internal stresses. However, this expansion must be controlled to prevent disintegration and breaking up of the mass within the die, and therefore it is necessary to maintain the compressed mass in its general compressed shape within the die cavity while relieveing the stresses therefrom. If the male die is caused to move away from the mass for a distance greater than that required to substantially release all the stresses while maintaining the mass in its general compressed form, the laminated sections occurring throughout the mass will be misplaced from their original relative positions, and the sections will not remate when a second pressure is applied. Instead, new stresses will be formed which will cause laminae stratification in the finished product.

After the stresses in the mass are relieved, a second pressure is applied to the laminated sections of the mass, and these sections are remated, particle for particle, to form their original shape. This second pressure must be of sufficient amplitude to form a coherent mass, but it is imperative that the second pressure be no greater in amplitude than the first. This second pressure is being applied to a series of horizontal sections formed by particles whose horizontal movement has been fixed by the first pressure, and therefore, the particles within these sections tend to resist further horizontal movement as long as the pressure applied thereto does not exceed that of the first pressure. Thus, few internal lateral stresses result within the mass of granular material during the second application of pressure thereto, and no internal stresses are present which are of sufficient strength to cause stratified laminae in the mass upon removal of the second pressure. Thus, as the second pressure is released, there is no perceptible expansion of the mass nor is there any noticeable horizontal expansion of the part when ejected from the die cavity.

If, during the pressure release stage between the successive applications of pressure to the granular mass, the male die is allowed to move away from the mass to a point sufficient to allow the laminated sections to become misplaced from their original position, new internal stresses will be formed within the mass when, upon the application of the second pressure, the sections fail to remate. In this case, the removal of the second pressure from the mass will again result in stratified laminae being formed in the compressed blank. It is imperative that the expansion of the mass be carefully controlled during the pressure release stage of this process and that substantially all stress be relieved to prevent the subsequent formation of additional laminae.

The novel process of this invention may be better understood by briefly considering the state of change experienced by the mass of finely divided material as the process proceeds. The original material introduced into the die cavity is in powder or dust-like form, and to effectively carry out the process, it is necessary to attempt to distribute the material evenly throughout the cavity. Since there is no flow quality to dry pressed ceramic material, any portion of the cavity containing an appreciable amount of material more than another portion thereof will cause the mass to be subjected to unequal pressures.

If unequal pressures are applied to the mass, laminae formed in the lesser compressed portion of the mass after the application of the first pressure of this method would not become knitted by the second pressure, because the greater compressed portions would receive the full pressure load. This prevents equal force from being applied to the lesser compressed portion of the mass to achieve proper mating between the laminae thereof.

Once the dust-like ceramic material had been evenly distributed in the die cavity, the male die must be introduced into the cavity at a speed just below that which would cause the dispelled air to blow the material particles from the cavity. Considerable air must be dispelled during the pressing operation, and the only escape of air as the male die enters the cavity is between the die and the cavity walls. Since this clearance is small, an excessively rapid entry of the male die causes the air rush through this opening at a high velocity, and this stream of air tends to carry with it particles lying close to the sidewalls of the cavity. This in turn causes the edges of the compressed mass to be compressed to a lesser degree during the first pressing step of this process with the results previously described. The novel apparatus of this invention, to be subsequently described, is designed to substantially overcome this male die entry speed limitation.

The male die continues to enter the die cavity until it contacts the finely divided material and exerts the desired peak pressure to accomplish the first pressing step of this method. For conventional ceramic tile with a thickness within the range of ¼ to ½ inch, it is found that this first peak pressure should be within the range of from 1500 to 4000 p.s.i. Of course, this peak pressure range varies with the thickness and type of material employed in the pressing process, and the use to be made of the end product obtained from the pressing process.

The application of the first peak pressure of the process converts the previously soft, light-weight, mobile material to a hard, dense, solid. In cross section, this solid mass resembles a plurality of flat, interleaved scales similar to fish scales. While the total weight is unchanged, this material mass is now less subject to lateral movement under vertically applied pressure in this metamorphorized form. Pressing the mass may be equated to pressing the top of a deck of cards, for pressure upon the deck will result in little or no lateral movement of the cards.

In its now form, after the release of the initial pressure in the die cavity, the previously finely divided material now constitutes pre-compressed and harder material which has a higher bulk density and occupies a much smaller space than the original uncompressed, dust-like material. Hence, the compression necessary to close the laminated voids of this denser material to form a cohesive solid requires much less vertical and resultant lateral movement of the mass then occurred in its original compression. The resistance of the mass in its new form to lateral movement upon the application thereto of like or lower pressure than that applied during the first pressing results in less stress imposed by the compressive forces on the side wall of the die cavity. This reduced stress reduces the lateral strains on the material to a point below the critical compressive stress of the material, thereby avoiding the occurrence of pressure cracks or horizontal laminated stratifications in the finished tile blank.

The second pressing step has been found to eliminate substantially all laminae stratification in a finished ceramic tile if the peak pressure applied during this step is maintained within the range of from 75 to 100% of the peak pressure in the initial pressing step. It has been found that this pressure range is sufficient to eliminate the stratifications occurring in the tile after the first pressure step, and as previously explained, it is essential that the second peak pressure does not exceed that of the first pressure step.

By employing the novel method of this invention, it is possible to successfully produce dry pressed ceramic tile from the highly mobile ceramic material dust at high compression pressures and at high speeds. Actually, the rate of speed at which this process is performed has not been found to be a limiting factor in the production of an acceptable tile product, and the only limit thus far noted on the pressing speed is that imposed by the limitations on the die entry speed into the mold cavity. The novel apparatus of this invention controls, to a great extent, the speed of the male die entry without substantially limiting the speed of the pressing apparatus.

Additionally, the method of this invention eliminates the necessity for subjecting the powdered material to be pressed to a number of predensification steps in preparation for the pressing operation. It has generally been the practice in the pressing of powdered material, particularly in the case of powdered ceramic material, to pelletize the material in a series of predensification steps prior to pressing. This densification of the material is necessary if an acceptable blank is to be obtained by the known pressing techniques.

The novel method of the present invention accomplishes densification and pressing of the powdered material in one step. The first maximum pressure on the material accomplishes the densification step and the second pressure the pressing step. Additionally, the densification step achieved by the method of this invention leaves the individual laminated sections within the densified mass in the form of flat laminae or scales which are not separated by the voids which occur between the pellets or granular particles formed by conventional prepelletizing densification methods. Thus, under the present method, the densified mass is formed for a second pressure step wherein the laminae will knit with the formation of minimal lateral strain within the mass. This is not accomplished with conventional predensified material, for the pellets formed by known methods move laterally within the mass during pressing, Referring now to FIGS. 1-3, it will be noted that the apparatus of this invention constitutes a high speed automated press indicated generally at 10. This press consists of a main frame 12 having an upper yoke 14 secured thereto by a plurality of elongated rods 16. This upper yoke supports two bearings 18 which rotatably mount a shaft 20 for a fly wheel 22. A suitable clutch 24, such as an air clutch, is provided to engage the fly wheel to the shaft 20.

Driving power for the press is provided by a motor 26 which is secured to upper yoke 14 and which directly drives the fly wheel 22 by means of a drive belt 28. This belt extends between a drive sheave 30 on the motor shaft and a belt receiving drive groove 32 formed around the outer periphery of the fly wheel.

Rotation of the fly wheel 22 and the shaft 20 causes rotation of a gear 34 which is secured to the end of the shaft opposite the fly wheel. Gear 34 meshes with a gear 36 which is fixed to one end of a crank shaft 38. The crank shaft rotates in bearings 40 which are secured to the upper yoke 14, and operates to drive a gear 42 which is secured to the end of the crank shaft opposite the gear 36. Gear 42 in turn engages and drives a gear 44 which is connected to drive a shaft 46 mounted in bearings 48 secured to the upper yoke 14. The shaft 46 constitutes a cam shaft to which are secured operating cams 50 and 52. These cams control the operation of a reciprocating filter box 54 (FIG. 3) through contact with roller cam followers 56 mounted upon filler box arms 58. The filler box arms 58 are positioned upon either side of the frame 12 and the upper end of each arm is pivoted at 60 to brackets 62 secured to the upper yoke 14. The lower end of each filler box arm is connected at 64 to a bracket 66 on the filler box, and thus the filler box is caused to reciprocate along a track 68 by the filler box arms 58. Springs 70 are connected between the frame 12 and the filler box arms 58 to insure that contact is maintained between the cam followers 56 and the cams 50 and 52.

The filler box 54 is filled with powdered material to be pressed by a material hopper 72. This hopper is supported by a bracket 74 welded to the frame 12, and is positioned to discharge material into the filler box when a hopper door 76 is actuated. The hopper door 76 is pivoted about a pivot point 78, and in its normal position closes the discharge opening at the lower end of the hopper 72. However, an air cylinder 80 having an operating piston 82 connected to the hopper door 76 is mounted on the hopper as a closure operator for the hopper door. The air cylinder operates under the control of an electrically controlled air valve 84 which, when actuated through a control mechanism to be subsequently described, perimts operating air to flow into the air cylinder from an input line 86 connected to a suitable air supply system. The electrically controlled valve 84 causes the piston 82 to selectively open or close the hopper door 76, thereby resulting in the controlled feeding of powdered material from the hopper to the filler box 54.

The pressing mechanism for the press 10 consists of an upper ram assembly 88 and a lower ram assembly 90. The upper ram assembly includes a crank arm 92 which pivots in bearings 94 mounted to the upper yoke 14. Pitman arms 96 are connected between the crank arm 92 and the crank shaft 38 so that rotation of the crank shaft drives the pitman arms, the crank arm 92, and a reciprocating ram pitman 98 which is mounted on the crank arm 92.

The lower end of ram pitman 98 is threaded to receive the threaded shank of a ball joint 100. This ball joint connects the ram pitman to an upper ram 102, which includes a ball socket 104 and a socket cap 106. The upper ram is guided in stationary guides 108 which are secured to the frame 12. Thus, the upper ram is driven vertically along the guides by the action of the ram pitman 98. The upper ram is connected to an upper pressing die 110 by means of telescopic bolts or guide pins 112. Also extending between the upper ram and the upper pressing die are biasing springs 114 which bias the pressing die outwardly away from the upper ram. These biasing springs separate the upper ram from the upper pressing die and permit a small degree of vertical movement of the upper ram without effecting a like movement of the upper pressing die.

The lower ram assembly 90 includes a cylinder 116 which is secured to the base of the frame 12. A piston 118 fits within the cylinder 116 and is maintained within the cylinder by a cylinder cap 120. A plunger 112 is fastened to the piston by fastening means 124, and the upper extremity of the plunger is secured to a top plate 126. The plunger is guided by bushings 128 secured to the frame 12 of the press, while the plate 126 supports a mold box operating mechanism 130 and a lower die 132.

The lower ram assembly, including an air activated mold box 134, the filler box 54, the lower die 132, the mold box operating assembly 130, and the plunger 122 float on a cushion of oil which acts upon the piston 118 within the cylinder 116. This complete assembly, with the exception of the cylinder 116, is movable vertically with movement of the piston 118 within the cylinder.

Figure 3:
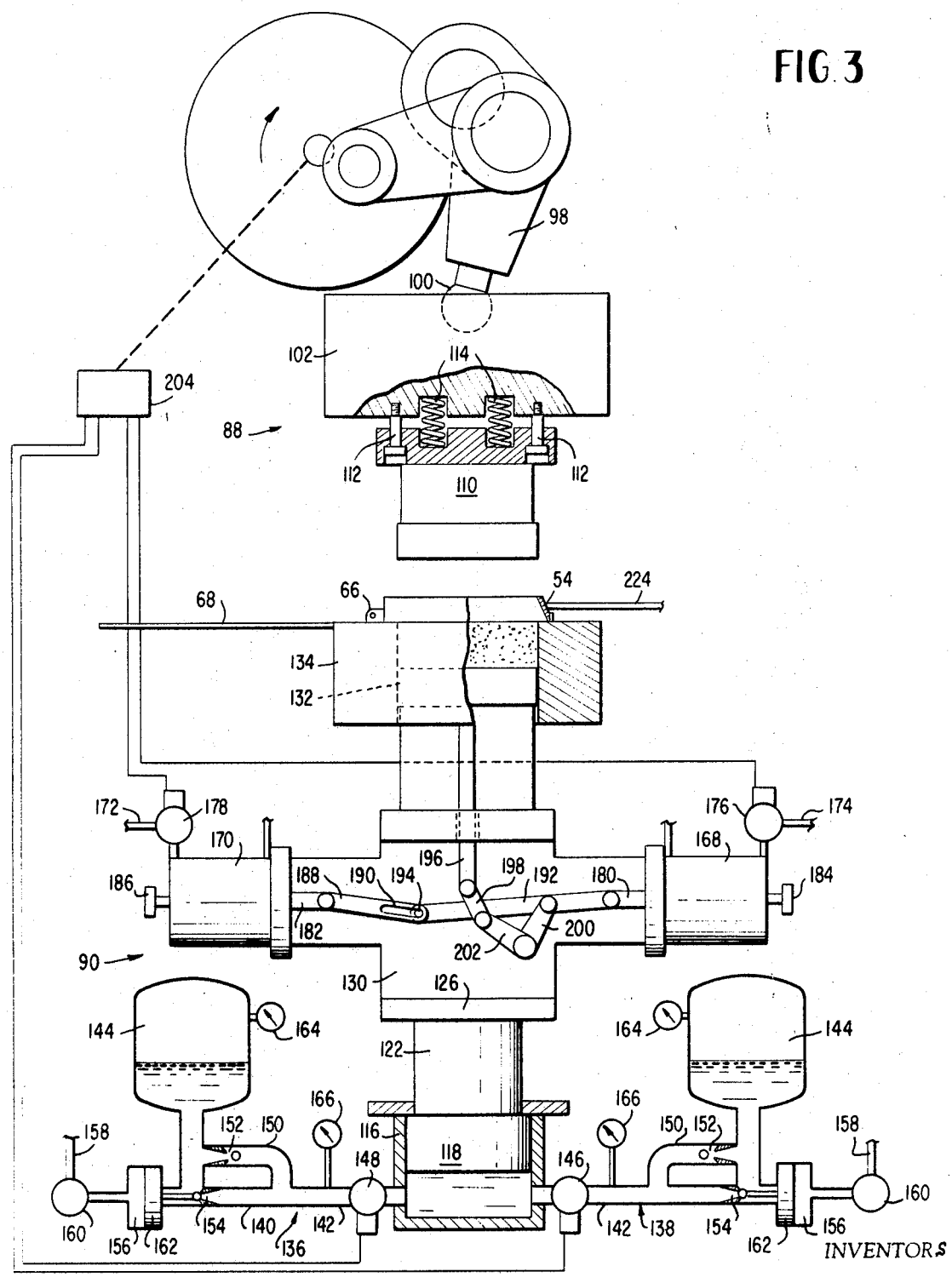
FIG. 3 is a diagrammatic view of the automated press of the present invention.

The oil cushion for the lower ram assembly 90 is provided by a hydraulic system indicated generally at 136 which is connected into the cylinder 116. The hydraulic system 136 may include two hydraulic sections 138 and 140 as shown in FIG. 3, or may be formed by a single hydraulic section as shown by FIG. 1. Whether the machine operates with one or two hydraulic sections in a manner which will be subsequently described, the construction of each hydraulic section is substantially identical, and therefore will be defined with reference to the hydraulic section 138 of FIG. 3.

Each hydraulic section includes an oil line 142 which connects an oil accumulator tank 144 to the cylinder 116. In the case of a two section system, as shown in FIG. 3, electrically controlled check valves 146 and 148 are provided in the line 142 so that the oil pressure in the cylinder 116 may be selectively controlled from either of the sections 138 or 140.

A branch line 150 communicates between the line 142 and the accumulator tank 144, and this branch line inincludes a check valve 152. In addition to the check valve in the branch line, an air relief valve 154 is provided in the line 142 between the accumulator tank and the cylinder 116. This air relief valve is responsive to air pressures developed within an air chamber 156 which receives air from a suitable air supply system through an inlet 158 and a pressure control valve 160. The pressure control valve 160 can be adjusted to vary the air pressure on a piston 162 within the air chamber 156 so that the bias pressure of the relief valve 154 can be correspondingly adjusted.

If desirable, pressure indicators 164 and 166 may be provided in the accumulator tank 144 and the line 142 to indicaate the respective pressures developed therein.

The mold box operating assembly 130 forms an important and novel feature of the press 10, and is therefore worthy of consideration in greater detail. With reference to FIGS. 1, 3 and 4, it will be noted that this mold box operating assembly includes two operataing air cylinders 168 and 170 which receive air from a suitable air system through inlets 172 and 174. Electrically controlled air inlet valves 176 and 178 may be provided in the air inlet lines 172 and 174 to selectively control the provision of air to the cylinders 168 and 170, and therefore also control the pistons 180 and 182 which operate in response to the air pressure within the cylinders. The air pressure within the cylinders 168 and consequently the extent of the travel of the piston 180 may be adjusted by an adjusting knob 184, while similarly, the air pressure within the cylinder 170 and the extent of travel of the piston 182 may be adjusted by an adjusting knob 186.

The pistons 180 and 182 are connected to a linkage for operating the mold box 134 between three vertically spaced positions. The piston 182 is connected to a link 188 having a slot 190 formed in the outer end thereof, while the piston 180 is connected to a link 192, the outer end of which is provided with a laterally extending pin 194 which rides in the slot 190. A shaft 196 extends outwardly from the mold box operatng assembly 130 and the outer end thereof is connected to the mold box 134. The inner end of the shaft 196 is connected to the link 192 within the mold box operating assembly by pivotally connected links constituting a link 198 connected to the shaft 196, a link 200 pivotally connected at one end to the link 192, and a link 202 pivotally connected at each end to the links 200 and 198, respectively.

It will be noted that the adjusting knobs 184 and 186, by controlling the extent of travel of the pistons 180 and 182, also control the limits of travel for the mold box 134. Thus these adjusting knobs may be employed to vary the depth of fill for the powdered material to be pressed.

The sequencing of the high speed automated press 10 is controlled by a programming unit 204 which functions to sequence the machine in timed relationship to the rotation of the fly wheel 22 and the crankshaft 38. This programming mechanism sequences the electrically controlled air valve 84 for the air cylinder 80, the electrically controlled check valves 146 and 148 for the hydraulic sections 138 and 140, and the air inlet valves 176 and 178 for the air cylinders 168 and 170. For each cycle of rotation, a complete pressing operation is completed in accordance with the method previously described.

Figure 2:
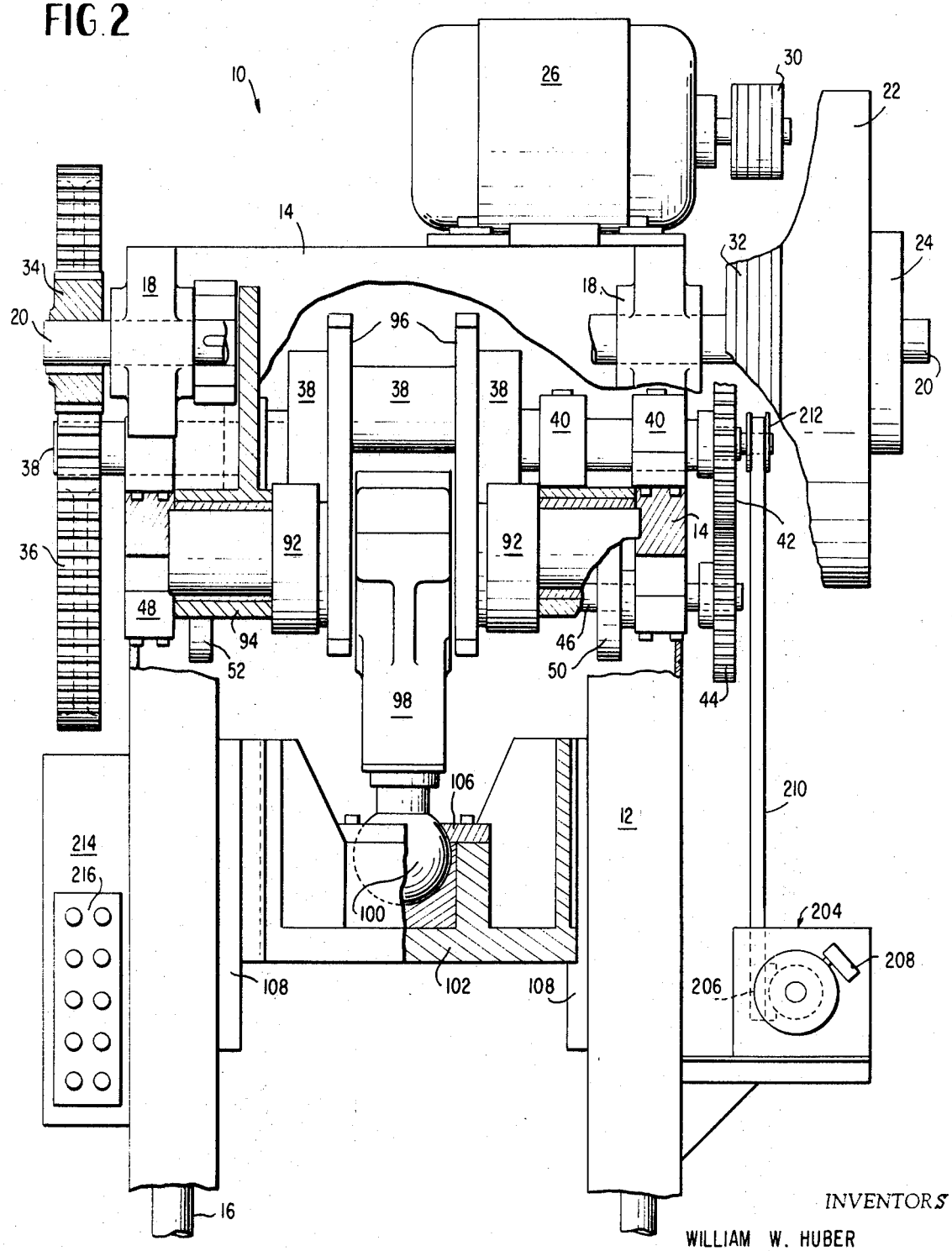
FIG. 2 is a sectional end elevational view of the upper ram assembly of the automated press of the present invention.

Referring to FIG. 2, the programming unit 204 includes a rotating timing switch operating unit 206 which sequentially controls a plurality of electrical switches 208. This switch operating unit is driven by a timing belt 210 from a pulley 212 secured to the crankshaft 38. Thus the switch operating unit is caused to rotate in timed relationship with the crankshaft 38, and the switches 208 are actuated during every cycle of rotation of the crankshaft.

The programming unit 204 may include any suitable switch unit for sequentially activating a plurality of switches. The switches 208 are individually connected between a power source, (not shown) and the air valve 84, the check valves 146 and 148, and the air inlet valves 176 and 178, and operate to make and break an electrical power circuit to a valve operating component. Thus, the valves operate under control of the programming unit.

In order to facilitate manual operation of the automated press 10, a manual switch box 214 is mounted upon the frame of the press and includes a plurality of manually actuated switches 216. The switches 216, like the switches 208, are connected between a power source and an individual electrically operated components of the press. These switches include a start-stop switch for the electrical motor 26, the air valve 84, the check valves 146 and 148, and the air inlet valves 176 and 178. Thus, the press can be manually controlled through a complete sequence of operation.

In considering the operational cycle for the automated press 10, the sequence of press functions will be described from a point wherein a blank formed during a previous pressing cycle is ejected from the press, and fresh powdered material is introduced into the mold box cavity in preparation for a subsequent pressing operation. The motor 26 has been subsequently energized by the switching unit 216, and the crankshaft 38 is rotating.

To understand the initial operation of the press 10, the functions performed by the mold box operating assembly 130 must first be considered. The mold box operating assembly is adapted for universal use in the formation of pressed blanks having a variety of shapes and configurations, and it is particularly noteworthy that this assembly permits custom-shaped ceramic pieces, such as trim pieces, to be rapidly produced in a completely automated operation. For illustrative purposes, the operation of the mold box operating assembly will be described in connection with the formation of a shaped ceramic trim piece blank, as illustrated by the diagrams of FIG. 5.

In the diagram of FIG. 5, it will be noted that the upper pressing die 110 and the lower die 132 are shaped to form a curved ceramic trim piece blank indicated at 218. After this trim piece has been formed, the crank arm 92, the pitman arms 96, and the ram pitman 98 are driven by the crankshaft 38 to raise the upper ram 102 and the upper pressing die away from contact with the lower pressing die and the formed ceramic blank. At the same time, the rotating switch operating unit 206 has activated switches in the switch bank 208 to energize the air inlet valve 178. This inlet valve opens to permit air to pass from the inlet 172 into the cylinder 170, and the piston 182 is driven forward to its outermost extremity. With the piston 182 so positioned while the piston 180 remains at its innermost extremity within the cylinder 168, the links 198, 200 and 202 operate under the control of the link 192 to move the shaft 196 and the mold box 134 downwardly in a vertical direction to the lowest mold box position. As the mold box moves to this lower position, the pressed trim piece blank 218 rests upon the lower die 132 and is fully exposed for removal by the filler box 54 as shown by FIG. 5B.

After the mold box 134 is lowered, the filler box 54, which has been filled with powdered material from the hopper 72, begins to move across the guide track 68 in the direction of the blank 218. The filler box has been previously filled with a controlled amount of material from the hopper 72 by opening the hopper door 76 with the air cylinder 80. This operation of the air cylinder occurs under the control of the air valve 84, which in turn is energized through the operation of one of the control switches 208. The filling of the filler box may be sequenced to occur at any desired time during the pressing operation of the press 10 so that the filler box will be ready to introduce powdered material to refill the mold box when a pressing operation is completed.

The filler box 54 is driven forward by the filler box arms 58 as the crank shaft 38 rotates to cause the cam shaft 46 to move the operating cams 50 and 52. The operating cams in turn contact the cam followers 56 on the filler box arms and drive the filler box forward until eject elements 224, mounted on the forward end of the filler box, contact and eject the formed blank 218 from the lower die 132.

As the filler box continues to move forward after the ejection of the blank, one of the switches 208 is activated to energize the air inlet valve 176 for the air cylinder 168. Air is now provided from the inlet 174 to the cylinder 168 so that the piston 180 is driven to its outermost extremity. Now, with both the pistons 182 and 180 at their outer limits, the link 192 causes the links 198, 200 and 202 to drive the shaft 196 so that the mold box 134 moves upwardly from the lowermost position to a second, intermediate position indicated in FIG. 5C. It will be noted that the mold box is provided with a material dam 220 in a manner known to the art, so that the filler box 54 will provide a build up of powdered material behind this dam as the filler box moves across the lower die 132. This excess material behind the dam is required to form the upwardly curved portion of the trim piece blank 218 when the upper pressed die moves into contact with the powdered material.

To permit the filler box to move across the lower die when the mold box 134 is in the position illustrated by FIG. 5C, the bottom of the filler box is cut away as indicated at 222 in FIG. 6. This permits the filler box to move across the dam 220 and the upper extremity of the lower die.

Finally, as the filler box reaches the extent of its travel across the lower die 132, the sequencing switching unit 208 is activated to cause the air inlet valve 178 to expel air from the cylinder 170, causing the piston 182 to move inwardly toward the cylinder. With the piston 182 at its innermost extremity and the piston 180 at its outermost extremity, the slot 190 and the link 188 operate on the pin 194 to raise the link 192, and consequently the links 198, 200 and 202 raise the shaft 196 so that the mold box 134 is moved to its uppermost position as indicated in FIG. 5D. With the mold box in this position, the operating cams 50 and 52 rotate to permit the filler box arms 58 to return the filler box to its initial position. As the filler box moves back over the lower die 134, it discharges material into the mold box 134 to completely fill the die cavity defined by the mold box. The mold box now remains in this raised position throughout the remainder of the pressing cycle for the automated press 10, and is caused to return to its lowermost position of FIG. 5A by a sequencing switch 208 which causes the air inlet valve 176 to expel air from the cylinder 168 while the air inlet valve 178 is again activated to inject air into the cylinder 170. This occurs when the pressed piece 218 is ready for ejection.

With the mold box 134 in its uppermost position and filled with powdered material for pressing, the fly wheel 22 and the crank shaft 38 continue to turn so that the crank arm 92, the pitman arms 96, and the ram pitman 98 drive the upper ram 102 down the guides 108. The springs 114 between the upper ram and the upper pressing die 110, which were previously fully extended, become gradually compressed as the upper pressing die enters the die cavity within the mold box 134. Thus the powdered material within the die cavity is not immediately subjected to the full pressure of the upper ram and pressing die, but instead, the time required for the springs 114 to compress also provides time for the expulsion of air from the die cavity. This slight delay during which a gradual increase of pressure occurs as the springs 114 compress is important, for the delay permits the press to operate at higher speeds without the danger of expelling air and powdered material from the die cavity. This expulsion of powdered material might occur if the powdered material was immediately subjected to the full pressure of the upper ram, for this would result in a rush of air under pressure from the die cavity.

Turning now to the hydraulic system 136, if the two hydraulic sections 138 and 140 are employed for the press 10, the sequencing switches 208 will be operated before the upper pressing die 110 enters the die cavity so that the check valve 146 will be closed while the check valve 148 will be open. This check valve operation permits oil from the oil accumulator tank 144 of the hydraulic section 140 to enter the cylinder 116 beneath the piston 118. In cases where only one hydraulic section is employed, check valves similar to the check valves 146 and 148 are not required, for there is no need to provide such a check valve to obstruct the flow of oil into the cylinder 116. The remainder of the operation of a single hydraulic section system would be identical to that to be hereinafter described for the dual section system illustrated in FIG. 3, with the exception that all functions to be described in connection with the hydraulic sections 138 and 140 would occur in a single hydraulic section.

With the check valve 148 opened, the operation of the components in the hydraulic system 140 must be considered. The check valve 152 is also initially opened and the system pressure developed in the accumulator tank 144 drives the oil through the line 150 and the line 142, into the cylinder 116. This normal oil pressure, which for illustrative purposes will be described as a pressure of 60 p.s.i., causes the piston 118 to maintain the lower die 132 in its uppermost position.

As the fly wheel 22 rotates and the upper pressing die 110 enters the die cavity and moves into contact with the powdered material therein, the springs 114 compress as previously described and a solid union is formed between the upper pressing die and the upper ram 102. With pressure applied to the lower die, the check valve 152 in the hydraulic section 140 is caused to close and as the air release valve 154 is also closed, the oil pressure begins to increase in the cylinder 116.

The fly wheel 24 and the crankshaft 38 continue to rotate until the upper ram 102 and the upper pressing die 110 are driven by the crank arm 92, the pitman arms 96, and the ram pitman 98 to a first position of maximum pressure. This driving action is diagrammatically illustrated in FIG. 3 wherein the connection between the pitman arms 96 and the crank shaft 38 is shown for illustrative purposes as an eccentric mounting which rotates clockwise about a circle. It will be noted that a first position of maximum pressure occurs when the crank shaft moves the pitman 96 to the six o'clock position on the circle in FIG. 3. At this point, the pitman arms will draw the ram pitman 98 to the left so that the ram pitman moves from an inclined toward a vertical position to increase the drive force on the upper pressing die 110.

With the upper pressing die 110 exerting maximum pressure at the first maximum pressure point on the material within the mold box 134, the lower ram assembly 90 moves slightly downward against the cushion of oil in the cylinder 116. The amount of this downward movement is determined by the maximum pressure requirement for the first pressing of the blank being formed, and this maximum pressure is regulated and controlled by the pressure control valve 160. This pressure control valve is adjusted so that air is admitted from the inlet 158 into the inner chamber 156 of the valve to maintain a controlled air bias against the piston 162. When the upper pressing die 110 exerts maximum pressure against the material in the die cavity and the lower die 132, the oil pressure from the cylinder 116 in the line 142 operates against the relief valve 154, and forces the valve open for a sufficient amount to maintain the desired pressure on the material being pressed. If this pressure is exceeded, the relief valve 154 opens to a greater extent to permit the lower ram assembly to move downwardly against the oil cushion in the cylinder 116 to relieve excess pressure on the pressed blank. Thus, the pressure created on the pressed blank by the mechanical action of the upper ram assembly 88 is accurately controlled hydraulically by the regulation of the oil pressure in the cylinder 116 by the pressure control valve 160.

The fly wheel 22 continues its cycle of rotation, and the cam shaft 38 moves the pitman arms 96 in a clockwise direction about the circle of FIG. 3 from the dead-center, six o'clock position upwardly to release the pressure on the upper pressing die 110. The ram pitman 98 raises the upper ram 102 sufficiently to open the connection between the upper ram and the upper pressing die and to relieve the spring pressure exerted by the springs 114 on the upper pressing die for an amount equivalent to the vertical expansive force of the compressed material within the mold box 134. However, the springs 114 maintain the upper pressing die 110 in contact with the surface of the pressed blank while simultaneously relieving the pressure on the blank to permit vertical expansion thereof and the formation of a laminar (flakelike) structure therein without lateral displacement of the compressed particles. Thus the release of the internal stresses within the compressed blank while substantially maintaining the pressed-shape thereof is accomplished.

The release of pressure on the upper ram assembly 88 releases the pressure against the air-release valve 154, thereby permitting this valve to close while the check valve 152 reopens to again establish normal oil pressure in the cylinder 116. At this time, if a two-section hydraulic system of the type illustrated in FIG. 3 is employed, the sequencing switches 208 are activated to close the check valve 148 and simultaneously open the check valve 146, so that oil pressure in the cylinder 116 is now controlled by the hydraulic section 138. The components of the hydraulic section 138 operate in exactly the same manner as previously described for those in the hydraulic section 140.

The crank shaft 36 now continues to rotate to cause the upper ram assembly 88 to subject the material within the mold box 134 to a second maximum pressure. This second pressing occurs when the pitman arms 96 are moved about the circle in FIG. 3 to a second dead-center point at a twelve o'clock position in the circle. Again the ram pitman 98 will extend vertically from the upper ram 102, and maximum pressure will again be applied to the pressed blank.

To control the second maximum pressure, the hydraulic section 138 operates in exactly the same manner as did the hydraulic section 140 during the first maximum pressure. However, when it is desirable to have the second pressing of the blank occur at a pressure which is less than that of the first pressing thereof, the pressure control valve 160 of the second hydraulic section is adjusted so that a lower oil pressure is maintained in the cylinder 116. This, in turn, results in the application of a lower pressure to the pressed part within the mold box 134, but as previously described, this second pressure must be at least 75% of that applied during the first maximum pressing of the part.

Should it be desirable to accomplish the first and second pressings of the pressed blank at substantially the same pressure, the second hydraulic section 138 can be eliminated.

After the second pressing of the pressed blank, the cycle of operation of the automated press 10 has been completed, and the blank is stripped from the lower die in the manner previously described. It should be noted that the two pressing operations, the intermediate release of stresses within the pressed blank, the stripping of the pressed blank and the refilling of the mold box all occur during a single rotational cycle of the cam shaft 38 and the fly wheel 22. As the blank is pressed in situ within the mold box 134; there being no necessity to raise the blank from the mold box to eject air therefrom, the complete pressing operation of the automated press assembly may occur during a very limited period of time.

It will be readily apparent to those skilled in the art that the present invention provides a novel method and automated press apparatus for dry pressing powdered granular material. Although this invention has been described particularly with respect to the dry pressing of powdered ceramic material, it will be apparent that the method and apparatus of this invention might be effectively employed to accomplish the dry pressing of many powdered materials, such as, for example, materials employed in powder metallurgy. The application of the method and apparatus of this invention, as well as the arrangement and types of components utilized within the invention may be subject to numerous modifications well within the perview of these inventors who intend only to be limited to a liberal interpretation of the specification and appended claims.

What we claim is:

1. In a high speed press for dry pressing finely divided granular material having an upper ram assembly including a vertically reciprocating upper pressing die for pressing said granular material during a pressing cycle and a lower ram assembly including a lower pressing die having a pressure surface for supporting said granular material in position for contact by said upper pressing die, said lower pressing die being normally immobile when out of contact with said upper pressing die and a mold box movable vertically about said lower pressing die to form a die cavity therewith for the reception of finely divided granular material, a mold box operating assembly comprising mold box drive means connected to drive said mold box vertically between a first position wherein said mold box is below the pressure surface of said lower pressing die, a second intermediate position above said first position and the pressure surface of said lower pressing die to facilitate partial filling of said die cavity, and a third position above said intermediate position to form the complete die cavity, and drive control means connected to control said drive means, said drive control means operating to cause said drive means to move said mold box from said first to said second position for the reception of granulated material and then subsequently to said third position to permit complete filling of said die cavity with granulated material and at the termination of said pressing cycle, to return said mold box to said first position.

2. The mold box operating assembly of claim 1 wherein said drive means includes adjust means to vary the extent of vertical travel of said mold box, said adjust means being operable to vary the depth of said die cavity.

3. A high speed press for dry pressing finely divided granular material in a cavity comprising a frame, an upper ram assembly supported on said frame for applying pressure to material in said die cavity, drive means on said frame to drive said upper ram assembly, a lower ram assembly mounted on said frame beneath said upper ram assembly, said lower ram assembly including a lower pressing die, a mold box movable vertically about said lower pressing die to form said die cavity, a mold box operating assembly connected to operate said mold box, and hydraulic mounting means to mount said mold box, lower pressing die, and mold box operating assembly upon a hydraulic cushion for vertical movement in response to pressure applied to the material in said die cavity, said hydraulic mounting means including cylinder means, piston means mounted within said cylinder means for movement relative thereto, one end of said piston means extending outwardly of said cylinder means to support said lower pressing die, mold box operating assembly and mold box, and hydraulic control means connected to provide fluid to said cylinder, said hydraulic control means including first and second hydraulic control sections connected to supply fluid under pressure to said cylinder means, each said hydraulic control section including an accumulator means, a relief valve means to control fluid flow from said cylinder means to said accumulator means in response to fluid pressure in said hydraulic control means, said relief valve means including variable pressure adjust means to vary the pressure response of said relief valve means, and flow control means including an externally controlled check valve mounted between said accumulator means and said cylinder means and activating means for said check valve, said activating means being operable to close the check valve in one of said hydraulic control sections upon opening the check valve in the remaining hydraulic control section.

4. The high speed press of claim 3 wherein said check valve activating means is responsive to the drive means for said upper ram assembly, said activating means operating to alternately open and close said check valves for said first and second hydraulic control sections each time said upper ram assembly applies pressure to the material in said die cavity.

5. The high speed press of claim 3 wherein said upper ram assembly includes an upper ram mounted upon said frame for vertical movement toward and away from said die cavity, an upper pressing die movably mounted beneath said upper ram in spaced relation thereto, mounting means secured to said upper ram for mounting said upper pressing die for movement into and away from contact with said upper ram, and biasing means extending between said upper ram and said upper pressing die.

6. The high speed press of claim 3 wherein said upper ram assembly includes an upper pressing die mounted for vertical movement into said die cavity, linkage means connected between said drive means and said upper pressing die to operate said upper pressing die, said drive means operating to cause said upper pressing die to enter said die cavity to apply pressure to the material therein twice during each operating cycle of said press, and program control means operative in response to said drive means, said program control means operating to control said activating means for the check valves in said first and second hydraulic control sections to alternatively open and close said relief valves each time said upper pressing die presses the material in said die cavity.

7. A high speed press for dry pressing finely divided granular material comprising an upper ram assembly supported on said frame, said upper ram assembly including a reciprocating upper pressing die for applying pressure to said granular material and drive means to drive said upper pressing die, said drive means operating to cause said upper pressing die to apply pressure to said granular material twice during each operating cycle of said press, a lower ram assembly mounted on said frame beneath said upper ram assembly, said lower ram assembly including a lower pressing die having a pressure surface for supporting said granular material in position for contact by said upper pressing die, hydraulic mounting means to mount said lower pressing die upon a hydraulic cushion for vertical movement in response to pressure applied to material supported by said pressure surface, said hydraulic mounting means including cylinder means, piston means mounted within said cylinder means for movement relative thereto, one end of said piston means extending outwardly of said cylinder means to support said lower pressing die, and hydraulic control means connected to provide fluid to said cylinder means to control the pressure applied by said upper pressing die to said granular material, said hydraulic control means including first and second hydraulic control sections connected to supply fluid under pressure to said cylinder means, each said hydraulic control section including variable fluid pressure control means to adjust the pressure of the fluid supplied by said control section independent of the remaining control section, and flow control means including an externally controlled check valve mounted to control the flow of fluid to said cylinder means and activating means for said check valves in said control sections operative to close the check valve in one control section upon opening the check valve in the remaining control section, said activating means operating to open each check valve once during each operating cycle of said press.

8. The high speed press of claim 7 wherein said activating means operates during each operating cycle of said press to open one of said check valves prior to the first pressing of said granular material by said upper pressing die and to open the remaining check valve prior to the second pressing of said granular material by the upper pressing die.

9. The high speed press of claim 8 wherein said activating means is responsive to the drive means for said upper pressing die.

10. The high speed press of claim 7 wherein said lower ram assembly includes a mold box and mold box operating assembly mounted on said piston means, said mold box being movable by said mold box operating assembly about said lower pressing die to form a die cavity therewith for the reception of said finely divided granular material, said mold box operating assembly including mold box drive means connected to drive said mold box vertically between a first position wherein said mold box is below the pressure surface of said lower pressing die, a second intermediate position above said first position and the pressure surface of said lower pressing die to facilitate partial filling of said die cavity, and a third position above said intermediate position to form the complete die cavity.

11. The high speed press of claim 10 wherein material supply means are provided upon said frame to supply finely divided granular material to said die cavity, said material supply means including a filler box mounted for horizontal reciprocating movement above said die cavity, filler box operating means connected to said filler box to selectively move said filler box into and away from a position above said die cavity and filler box supply means operable to provide said finely divided granular material to said filler box, and program control means operative in response to the position of said upper pressing die, said program control means operating to control the filler box operating means and mold box drive means to sequentially move said mold box from said first to said second positions and subsequently to said third position in timed relationship to the movement of said filler box and upper pressing die, and to return said mold box to said first position subsequent to the second pressing of said upper pressing die.

12. The high speed press of claim 11 wherein said program control means operates to control the activating means for said check valves to cause said activating means to open one of said check valves prior to the first pressing of said finely divided granular material by said upper pressing die and to open the remaining check valve prior to the second pressing of said finely divided granular material by said upper pressing die.

13. The mold box operating assembly of claim 2 wherein said drive means includes first and second spaced, oppositely disposed piston units, each such piston unit including a piston and a drive cylinder for said piston, and linkage means connected between said pistons and said mold box.

References Cited

UNITED STATES PATENTS

| | | | |
|---|---|---|---|
| 1,223,457 | 4/1917 | Wettlaufer | 25—89 |
| 2,598,016 | 5/1952 | Richardson | 18—16.5 X |

J. SPENCER OVERHOLSER, Primary Examiner

D. W. JONES, Assistant Examiner

U.S. Cl. X.R.

18—16.5